E. L. SHARPNECK.
ANTIFRICTION BEARING.
APPLICATION FILED FEB. 28, 1910.

1,064,863.

Patented June 17, 1913.

WITNESSES
C. P. Way.
F. E. Fitzgerald

INVENTOR
Eliel L. Sharpneck
By Henry J. Miller
atty.

UNITED STATES PATENT OFFICE.

ELIEL L. SHARPNECK, OF WINTHROP, MASSACHUSETTS.

ANTIFRICTION-BEARING.

1,064,863.  Specification of Letters Patent.  Patented June 17, 1913.

Application filed February 28, 1910.  Serial No. 546,426.

*To all whom it may concern:*

Be it known that I, ELIEL L. SHARPNECK, of Winthrop, in the county of Suffolk and State of Massachusetts, have invented certain new and useful Improvements in Antifriction-Bearings, of which the following is a specification, reference being had to the accompanying drawings, forming part thereof.

This invention relates to antifriction bearings and more particularly to a combined roller and ball-bearing.

The object of the invention is to provide an antifriction bearing, which is efficient, simple to manufacture, and durable, and one which is adapted for heavy work, such as automobile bearings, car journals and shafting.

With the above objects in view the invention consists in the antifriction bearing hereinafter described and particularly defined in the claim, the advantages of which will be obvious to those skilled in the art from the following description.

The several features of the invention will be clearly understood from an inspection of the accompanying drawing and the following detailed description of the construction shown therein.

Figure 1:
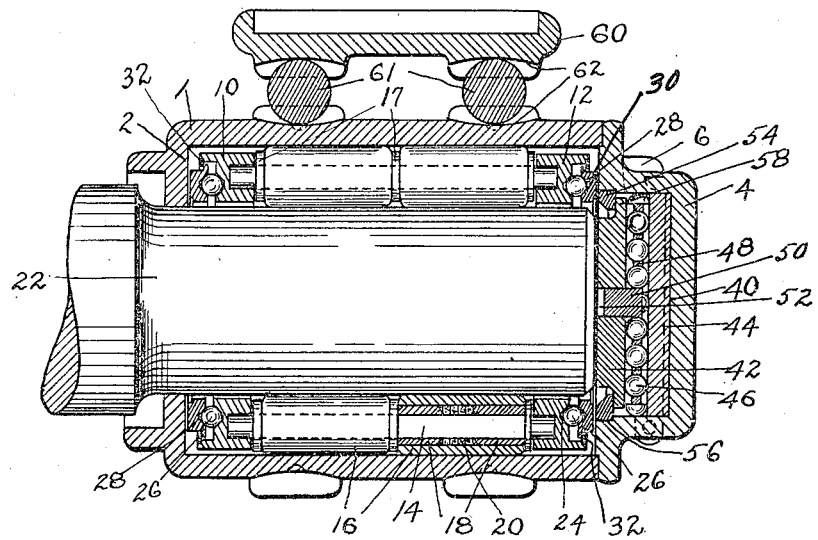
Figure 2:
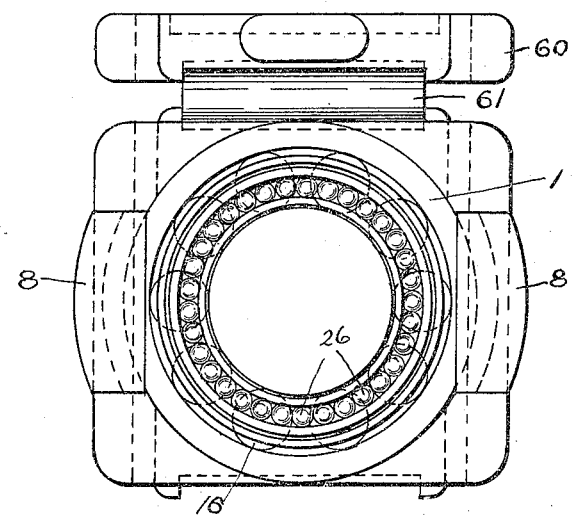
Figure 3:
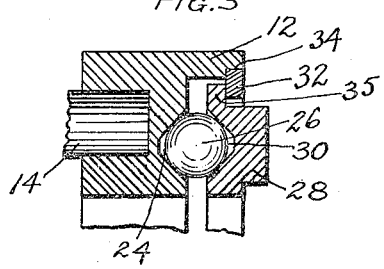

In the accompanying drawing, Figure 1 is a central longitudinal vertical section of the bearing. Fig. 2 is an end view with the cover or cap removed; and Fig. 3 is a fragmentary detailed sectional view on an enlarged scale.

As illustrated in the drawing the bearing comprises a cylindrical casing or shell 1, having the shoulder 2 at its inner end, and a removable cap or cover 4 at its outer end, held in place by means of keys 6, which engage lugs or ears 8 formed on the exterior of the end of the casing. Within the casing 1 is a cage composed of end rings 10 and 12 connected by a series of rods or pins 14, having their ends driven into the rings. These cage pins, in the present instance 10 in number, give the requisite strength to the cage and form a support for the steel rollers 16. The rollers 16 are hollow and provided with antifriction bushings 18, separated by washers 20, which are adapted to receive a lubricant. The rollers are of the proper diameter to roll freely between the periphery of the shaft or axle 22 and the interior of the shell or casing 1. The rollers 16 are separated from each other and from the end rings of the cage by washers 17 carried by the pins 14. The outer face of each cage ring is formed with a V-shaped groove or ball-race 24, within which a series of steel balls 26, are held by means of an auxiliary ring 28, provided with a complementary V-shaped groove or ball-race 30. Each auxiliary ring 28, is held in position by a ring 32, tightly driven into a counter-bore 34, formed within the outer edge of the cage ring and engaging a flange 35, formed on the auxiliary ring. Thus the cage rings 10 and 12 and their auxiliary rings 28, together with the steel balls held therebetween constitute four-point ball bearings, and eliminate friction in case the auxiliary rings should come in contact with either end of the bearing casing.

The cap or cover 4, is formed with an axially disposed pocket or recess 40, within which an end-thrust bearing is held. This end-thrust bearing comprises two steel plates or disks 42 and 44 between which a series of steel balls 46 are interposed held within a plate or separator 48, which is provided with a stem or boss 50 which enters a hole 52 formed in the disk 42. The balls 46 are located quite closely together over the entire area of the separator. The end-thrust bearing is held within the pocket 40 by means of a ring 54 driven into a counterbore 56 in the inner face of the cap 4 and which engages a flange 58 on the disk 42.

Mounted above the bearing is a saddle 60, which forms a support for springs when the bearing is applied to a car, and the saddle is supported upon rolls 61 mounted between the latter and the shell 1. These rolls co-act with the inclined surfaces 62 formed on the casing 1 and the saddle 60, and allow a free lateral motion of the car truck relative to the axle. If the shell 1 is moved longitudinally relatively to the axle so as to bring the disk 42 into contact with the end of the axle, the end-thrust is taken up by the end-thrust bearing.

From the construction above set forth it will be noticed that a roller bearing is provided which is simple and durable in construction and which is adapted for very heavy loads. And combined with the roller bearing are ball bearing thrust bearings which come into play when the roller bearing is moved endwise with respect to the outer shell, or when the shaft or axle, or the casing are moved longitudinally relatively to one another, thus eliminating friction between relatively movable parts.

Having thus described the invention what is claimed is:

In an antifriction bearing, the combination of a cage comprising end rings each provided with a ball-race on its outer face, pins connecting said end rings, hollow rollers on said pins, antifriction bushings and washers within said rollers mounted to rotate freely on said pins, washers separating the rollers longitudinally on the pins, auxiliary rings held within said end rings, and each having a ball-race opposed to the ball-race on the end ring, and balls coöperating with said races, substantially as described.

ELIEL L. SHARPNECK.

Witnesses:
 WM. P. EVERTS,
 W. J. MILLER.

Copies of this patent may be obtained for five cents each, by addressing the "Commissioner of Patents, Washington, D. C."